Patented Aug. 1, 1933

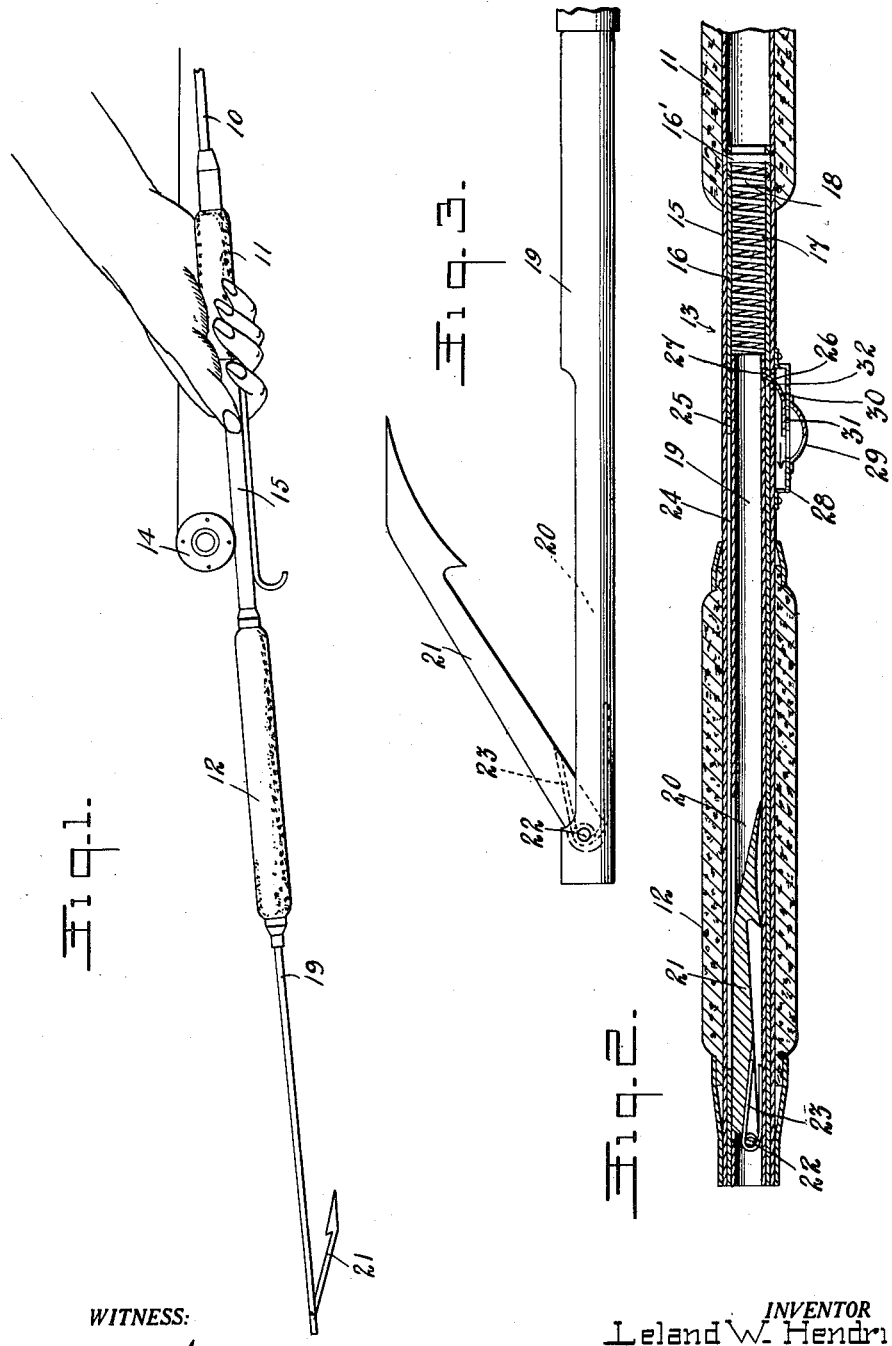

1,920,790

UNITED STATES PATENT OFFICE 1,920,790

GAFF

Leland W. Hendrie, Philadelphia, Pa.

Application May 25, 1931. Serial No. 539,920

6 Claims. (Cl. 43—5)

The invention relates to an extensible gaff adapted to be associated with the handle of a fishing rod.

A further object of the invention is to provide a gaff mounted upon a member telescoping within a fishing rod, and with means for maintaining the gaff in withdrawn position.

A further object of the invention is to provide a gaff mounted upon a spring pressed member slidable within a tubular member, the tubular member being mounted within the handle of a fishing rod.

The invention therefore comprises in combination with a fishing rod of substantially the usual and ordinary type, a tubular casing formed therein, provided with a spring, a shaft slidable within the casing and energized by the springs to eject the shaft from the casing, with means for limiting the ejecting movement with a gaff hingedly mounted upon the shaft and foldable within the lines of said shaft, and a lock for maintaining the shaft withdrawn within the casing.

The drawing illustrates an embodiment of the invention and the views therein are as follows:

Figure 1 is a perspective view of the handle of a fishing rod, showing the gaff associated therewith and extended therefrom in operative position, Figure 2 is a longitudinal diametrical sectional view, showing the gaff in inserted position, and Figure 3 is an enlarged detail view of the gaff and a section of the shaft in elevation with the gaff raised.

Like characters of reference indicate corresponding parts throughout the several views.

The improved gaff construction, which forms the subject matter of this application, is adapted to be associated with a fishing rod of any usual and ordinary type, as the rod 10. This rod 10 is provided with the usual hand grips 11 and 12, with an intervening space 13 for attachment of a reel, shown conventionally at 14.

The handle of the fishing rod differs from the ordinary type, being provided with a tube 15 which extends throughout the length of the handle, and the present invention is associated therewith by inserting into said tube 15, a tubular casing 16 which is secured therein in any approved manner as by the pin 16' which may and preferably will be concealed beneath one of the grips 11.

The tubular casing 16 is provided with a spring 17 which is preferably secured in said casing by a pin 18.

Mounted within the tubular casing 16, is a shaft 19 which has a recess into which the gaff 21 folds as shown at Figure 2. The folding is brought about by means of fulcruming the gaff at 22 and providing a spring 23, serving to throw said gaff from folded position as shown at Figure 2 to open positions as shown at Figures 1 and 3. This shaft 19 is seated against the spring 17, and when the shaft is in inserted position, as shown at Figure 2, with the gaff folded, the spring 17 is under its maximum tension. The casing 16 is provided with a longitudinal slot 24, and the shaft with a pin 25, sliding in said slot, which limits the longitudinal movements of the shaft 19 relative to the casing 16.

For holding the shaft in inserted position, the casing 16 is provided with a cut 26 and the shaft with a notch 27. Upon the exterior of the tube 15, a lock is provided comprising a member 28 which is rigidly secured to the tube 15. Mounted upon this member 28 is a sliding thumb piece 29. To this thumb piece 29 is secured a spring detent 30. The securing may be by means of a rivet 31 through a slot 32, so that the spring 30 maintains the thumb piece 29 in sliding engagement. When the thumb piece 29 is moved in the direction indicated by the arrow, the spring detent 30 is drawn over the abutment 32 formed as one edge of the cut 26, and thereby withdrawn from the notch 27 in the shaft. This releases the shaft to act under the tension of the spring 17 which immediately ejects it to the extended position as shown at Figure 1, and as soon as the gaff 21 has escaped the casing 16, the spring 23 serves to expand the gaff to open position as shown at Figures 1 and 3. To refold, the gaff is manually folded into the recess 20 and the gaff pushed home against the tension of the spring 17. The return movements of the thumb piece 29, either manually or under the action of the spring detent 30, will serve to lock the shaft and gaff in enclosed position.

Of course, the gaff construction, herein illustrated may be modified and changed in various ways without departing from the invention herein set forth and hereinafter claimed.

The invention is hereby claimed as follows:

1. The combination with a fishing pole, having a tubular handle open at the end opposite the pole, a spring within the tubular handle, a shaft within the tubular handle adapted to place the spring under tension, a gaff carried pivotally by the shaft, a spring tending to move the gaff upon its pivot, and means to lock the shaft within the tubular handle.

2. The combination with a fishing pole having a tubular handle open at the end opposite the pole, a spring within the tubular handle, a shaft within the tubular handle bearing upon and adapted, when manually telescoped, to place the spring under tension, a gaff carried pivotally by the shaft, a spring tending to move the gaff upon the pivot, and means to lock the shaft within the tubular handle.

3. The combination with a fishing pole having a tubular handle open at the end opposite the pole, a spring having one end fixed within the tubular handle, a shaft within the tubular handle bearing upon the opposite end of and adapted, when manually telescoped, to place the spring under tension, a gaff carried pivotally by the shaft, a spring tending to move the gaff upon the pivot, and means to lock the shaft within the tubular handle.

4. The combination with a fishing pole having a tubular handle open at the end opposite the pole, a spring within the tubular handle, a shaft within the tubular handle bearing upon and adapted, when manually telescoped, to place the spring under tension, a gaff carried pivotally by the shaft, a spring tending to move the gaff upon the pivot to an acute angle relative to the shaft, and means to lock the shaft within the tubular handle.

5. The combination with a fishing pole having a tubular handle open at the end opposite the pole, a spring within the tubular handle, a shaft within the tubular handle bearing upon and adapted, when manually telescoped, to place the spring under tension, a gaff carried pivotally by the shaft, a spring tending to move the gaff upon the pivot, and manually released means to lock the shaft within the tubular handle.

6. The combination with a fishing pole having a tubular handle open at the end opposite the pole, a spring having one end fixed within the tubular handle, a shaft within the tubular handle bearing upon the opposite end of and adapted, when manually telescoped, to place the spring under tension, a gaff carried pivotally by the shaft, a spring tending to move the gaff upon the pivot to an acute angle relative to the shaft, and manually released means to lock the shaft within the tubular handle.

LELAND W. HENDRIE.